(12) United States Patent
Huang et al.

(10) Patent No.: US 10,354,525 B2
(45) Date of Patent: Jul. 16, 2019

(54) ALERTING SYSTEM AND METHOD THEREOF

(71) Applicants: Mindtronic AI Co., Ltd., Grand Cayman (KY); Shanghai XPT Technology Limited, Shanghai (CN)

(72) Inventors: Mu-Jen Huang, Taipei (TW); Ya-Li Tai, Taoyuan (TW); Yu-Sian Jiang, Kaohsiung (TW); Tianle Chen, Shanghai (TW); Junyan Zhang, Shanghai (CN)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 15/983,094

(22) Filed: May 18, 2018

(65) Prior Publication Data

US 2019/0139407 A1 May 9, 2019

(30) Foreign Application Priority Data

Nov. 3, 2017 (CN) .......................... 2017 1 1072396
Nov. 3, 2017 (CN) .......................... 2017 2 1455479

(51) Int. Cl.
| | |
|---|---|
| *G08G 1/0967* | (2006.01) |
| *G06K 9/00* | (2006.01) |
| *G08G 1/16* | (2006.01) |
| *B60Q 9/00* | (2006.01) |

(52) U.S. Cl.
CPC ............. *G08G 1/0967* (2013.01); *B60Q 9/00* (2013.01); *G06K 9/00818* (2013.01); *G06K 9/00825* (2013.01); *G08G 1/166* (2013.01)

(58) Field of Classification Search
CPC .. G08G 1/0967; G08G 1/166; G06K 9/00818; G06K 9/00825
USPC ......................................... 340/905
See application file for complete search history.

(56) References Cited

U.S. PATENT DOCUMENTS

| | | | | |
|---|---|---|---|---|
| 6,091,323 A | * | 7/2000 | Kawai ................... | B60Q 9/008 340/435 |
| 6,906,619 B2 | * | 6/2005 | Williams ................ | B60Q 9/00 340/425.5 |
| 8,031,062 B2 | * | 10/2011 | Smith .................... | G08G 1/166 340/438 |
| 9,092,986 B2 | * | 7/2015 | Salomonsson ..... | G06K 9/00825 |
| 9,318,020 B2 | * | 4/2016 | Salomonsson ..... | G06K 9/00825 |
| 9,824,581 B2 | * | 11/2017 | Bhat .................. | G08G 1/09623 |
| 9,925,832 B2 | * | 3/2018 | Osugi ...................... | B60Q 9/00 |

* cited by examiner

*Primary Examiner* — John A Tweel, Jr.
(74) *Attorney, Agent, or Firm* — Winston Hsu

(57) ABSTRACT

An alerting system includes an image capturing module continuously captures traffic images surrounding a vehicle and showing at least one traffic sign therein; a gaze detector continuously detects a gaze direction of a driver in the vehicle; a control unit analyzes the traffic images and generates a trigger signal when it determines that the traffic sign changes and the driver fails to notice the change; and an alarming device alerts the driver upon the receipt of the trigger signal.

16 Claims, 5 Drawing Sheets

ALERTING SYSTEM AND METHOD THEREOF

BACKGROUND OF THE INVENTION

1. Field of the Invention

The present invention relates to an alerting system and method thereof, and more particularly to a system and a method thereof capable of alerting a driver when a traffic sign changes and the driver fails to pay attentions to it.

2. Description of the Prior Art

When driving, drivers must always keep attentions on traffic signs to avoid violations. Sometimes, however, there are sudden conditions, such as a jaywalking pedestrian, a cutting-off vehicle, etc. that could divert a driver's focus on the traffic signs. Assuming under such circumstance a traffic light changes and the driver of vehicle does not see it, he/she may not be able to react timely and violation or, in a worst case, collisions may occur.

Additionally, when a traffic light turns red, vehicles behind the traffic light must stop and wait. Occasionally, the waiting may be too long to keep drivers' attentions. When the traffic light turns green, those who are unaware may not be able to move instantly and therefore result in traffic jams.

SUMMARY OF THE INVENTION

In view of the foregoing, the present invention provides an alerting system and method thereof.

According to some embodiments, the present invention discloses an alerting system disposed in a vehicle. The alerting system includes: an image capturing module captures traffic images surrounding the vehicle and showing at least one traffic sign thereon; a gaze detector detects a gaze direction of a driver in the vehicle; a control unit connected to the image capturing module and the gaze detector, wherein the control unit analyzes the traffic images and generates a trigger signal when it determines that the traffic sign changes and the driver fails to notice it; and an alarming device alerts the driver upon the receipt of the trigger signal.

According to another some embodiments, the present invention discloses a method of alerting a driver in a vehicle. The method includes: gathering a plurality of traffic images showing at least one traffic sign; detecting the driver's gaze direction; determining if the traffic sign changes based on the traffic images; and alerting the driver if the traffic sign changes and the driver fails to notice the change.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
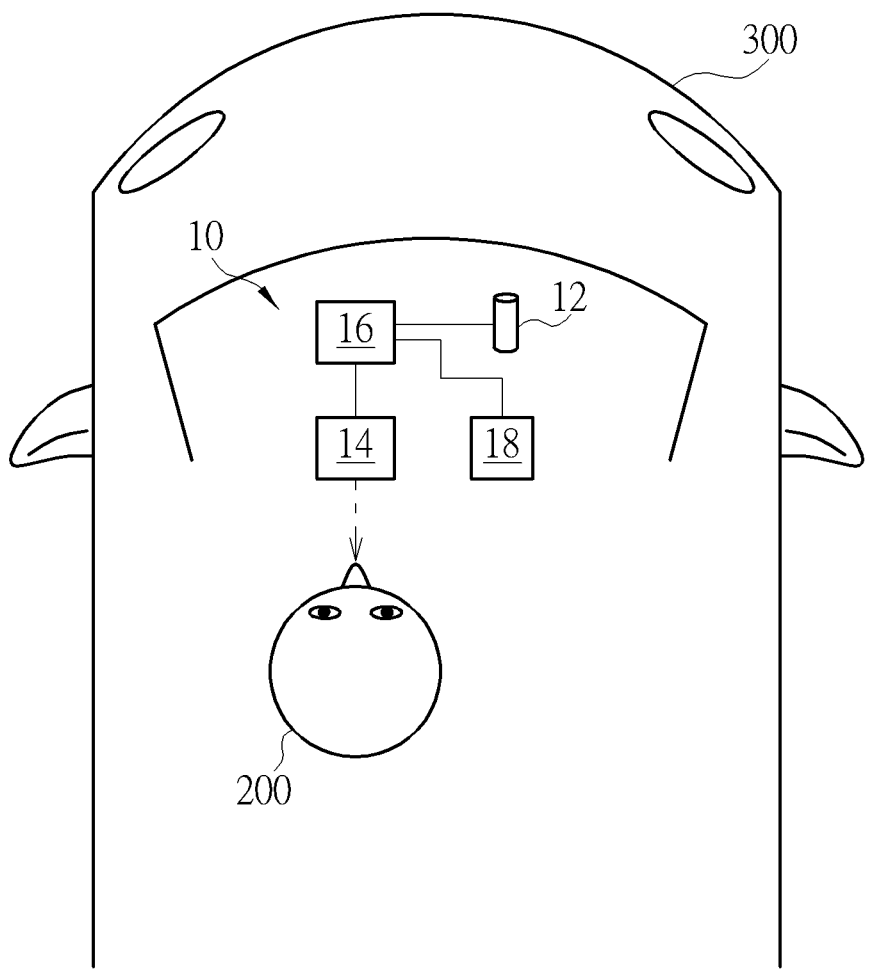
FIG. 1 is a diagram showing an alerting system according to one embodiment of the present invention.

FIG. 1 illustrates an alerting system 10 according to an embodiment of the present invention. As shown in FIG. 1, the alerting system 10 is arranged on a vehicle 300. The alerting system 10 includes an image capturing module 12, a gaze detector 14, a control unit 16 and an alarming device 18. The image capturing module 12 is configured to capture traffic images surrounding the vehicle 300. The traffic images may include one or more traffic signs instructing drivers to move, stop or slow vehicles. The gaze detector 14 is configured to detect a gaze direction of a driver 200 in the vehicle 300. The control unit 16 is connected to the image capturing module 12 and the gaze detector 14. The control unit 16 is configured to process the traffic images captured by the image capturing module 12 and generate a trigger signal if the preset criteria are met. The alarming device 18 is configured to alert the driver 200 about the change of the traffic light upon receiving the trigger signal.

Figure 2:
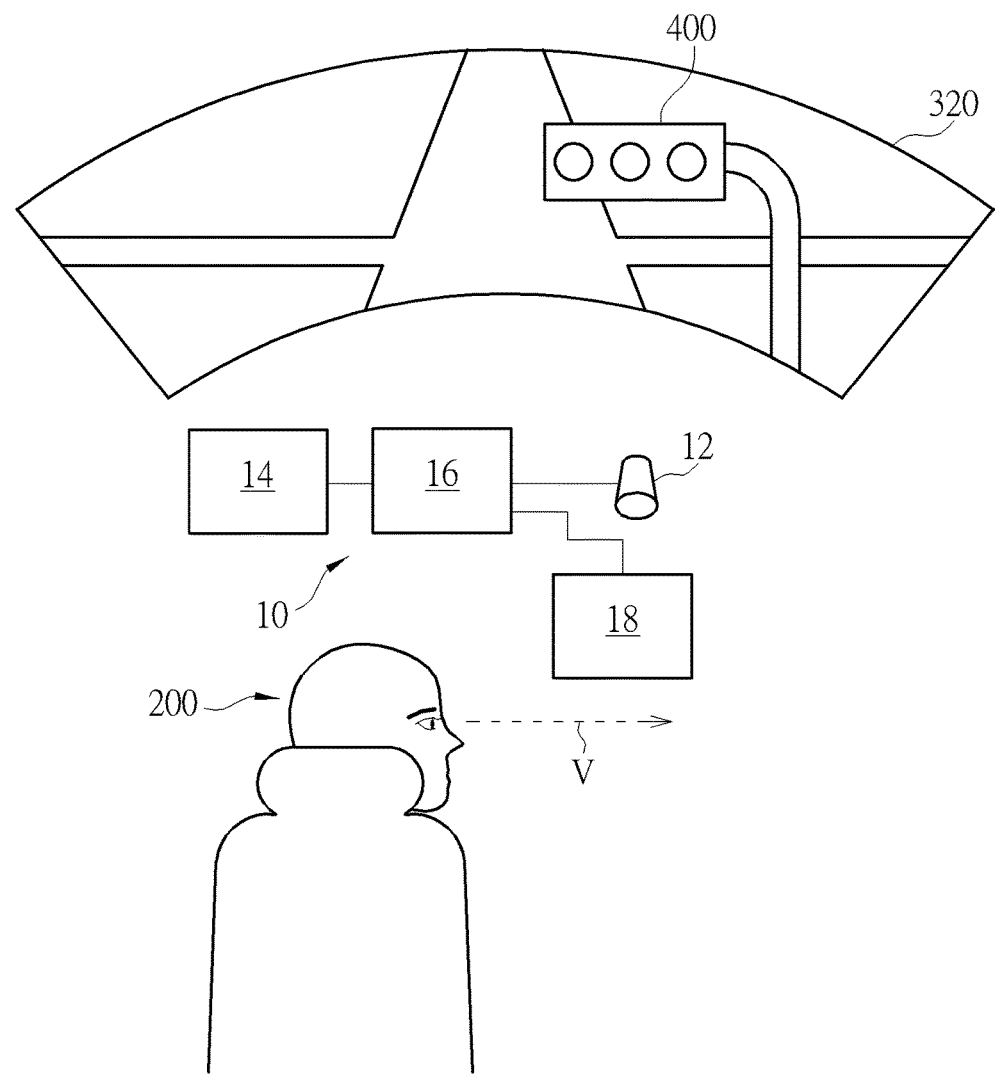
FIG. 2 and FIG. 3 depict the scenarios explaining how an alerting system works in accordance with the present invention.

FIG. 2 depicts an embodiment explaining how the present alerting system 10 works. As shown, the gaze detector 14 continuously detects a gaze direction V of the driver 200. Meanwhile, the image capturing module 12 continuously captures the traffic images surrounding the vehicle 300 including a traffic light 400. In one embodiment, the image capturing module 12 may be arranged inside the vehicle, so the capturing is through the windshield 320. One however should appreciate that this sort of arrangement is a mere example and should not in any event become a limitation to the present invention. That is, the image capturing module 12 may be disposed at any place of the vehicle so long as it can capture crucial traffic images clearly and soundly.

In one scenario, assuming the vehicle 300 stops because the traffic light 400 is red (i.e. a first traffic state). While waiting, the driver 200 looks right to talk to the passenger. Under such circumstance, the gaze detector 14 also detects the driver 200 is not looking at the traffic light 400 because the gaze direction V is toward the right. Meanwhile, the control unit 16 analyzes the traffic images captured by the image capturing module 12. Assuming the control unit 16, based on the captured images, determines that the traffic light 400 just turns green (i.e. a second traffic state), it then generates a trigger signal to the alarming device 18. Upon receiving the trigger signal, the alarming device 18 alerts the driver 200 about the change of the traffic light 400 so that the driver 200 can promptly move the vehicle 300. In one embodiment, the alarming device 18 may alert the driver 200 via, for instance without limitation, sounds, lights, images, vibrations, or any combination of the above, etc.

There are many known algorithms and methods provided for traffic sign/light recognition based on captured images. For instance, some techniques concern color changes, and some are based upon spectrum. The present invention may adopt any of these technologies so long as the purpose is met.

Figure 3:
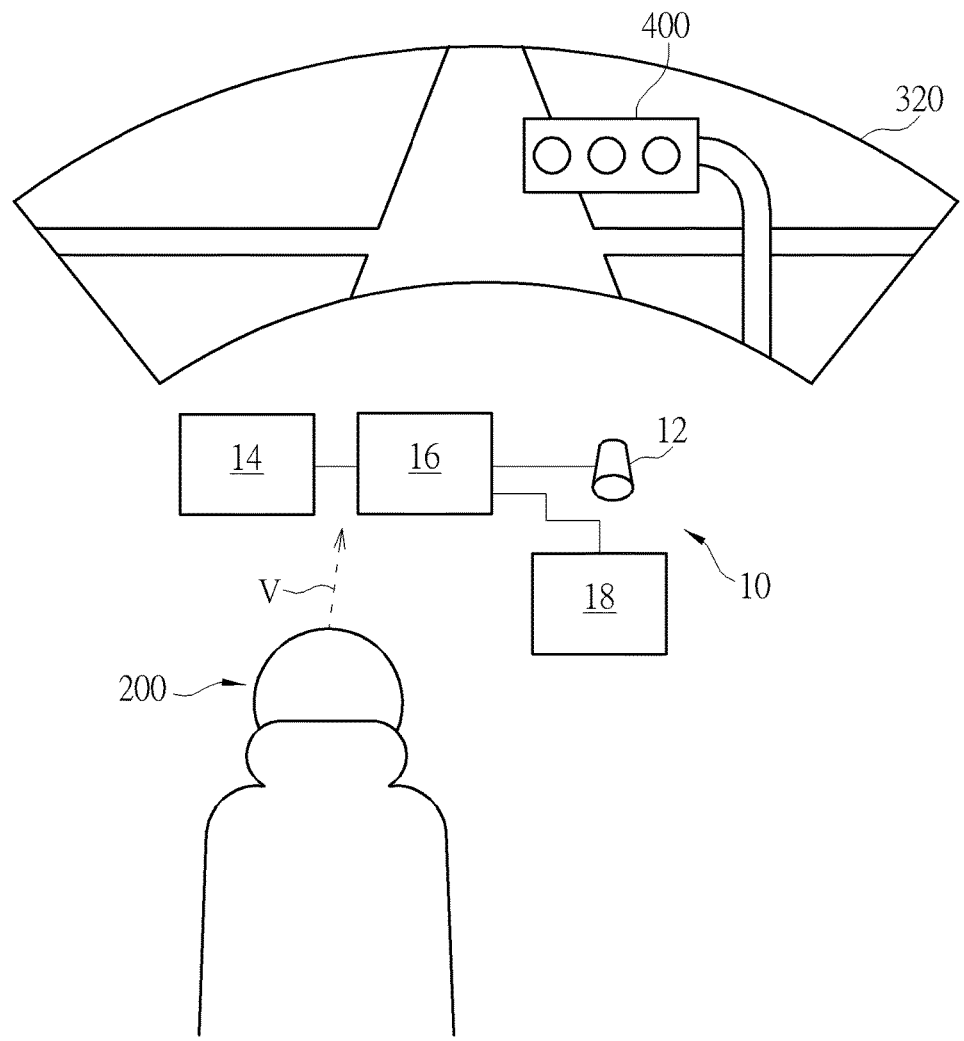

FIG. 3 illustrates another embodiment showing how the alerting system 10 works in accordance with the present invention. Continuing to the previous example, assuming the alerting system 10 has alerted the driver 200 and the gaze detector 14 also detects that the driver 200 is now looking onward. Thus, the control unit 16 concludes that the driver 200 is aware of the traffic light changes, and consequently it turns off the alarming device 18.

According the present invention, the driver 200 will be alerted while the traffic light has changed and the driver is not looking at the traffic light 400 to reduce possible traffic jams. It should be noted that the alerting system 10 of the present invention will not alert the driver 200 merely because the traffic light changes. Sometimes the driver 200 does not move the vehicle 200 not because he/she is unaware of the traffic light but because pedestrians are walking through, or other vehicles are not moving. Thus, the system 10 of the present invention will alert only when it also determines that the driver 200 fails to notice the traffic light changes. The determination is made by reference to the driver's gaze direction V. If the gaze direction V is not toward the traffic light 400, the system 10 presumes that the driver 200 does not see the traffic light and therefore gives alerts.

The red-to-green traffic light change is exampled to explain the function of the alerting system 10. It should be noted that any traffic lights or traffic signs may also be applicable in the present invention. For instance, a traffic light indicating when making a turn is permissible will also fall within the scope of the disclosure.

Additionally, the present invention may also be applicable in a scenario where the traffic light is turning red. Similarly, if the alerting system 10 detects the change from green to red, and also determines that the driver's gaze direction V is not toward the traffic light 400, the alerting system 10 also alerts the driver 200 to avoid potential traffic tragedies.

Figure 4:
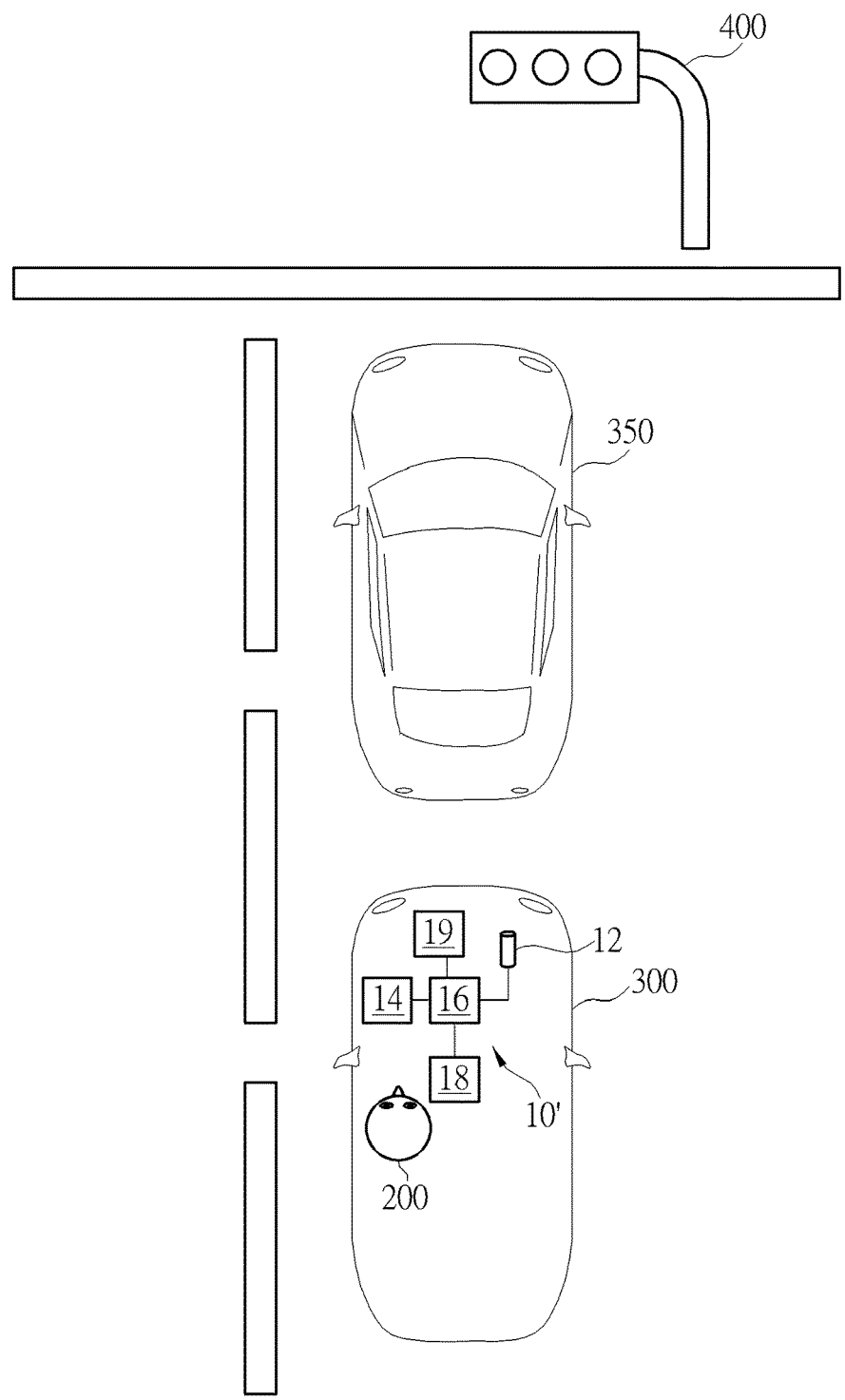
FIG. 4 is a diagram showing an alerting system according to another embodiment of the present invention.

FIG. 4 illustrates another scenario where an alerting system of the present invention may also apply. Assuming the alerting system 10' is disposed in the vehicle 300. Like the above embodiment, the alerting system 10' also includes an image capturing module 12, a gaze detector 14, a control unit 16, and an alarming device 18. The functions of these components are identical to the previous discussion and are skipped herein. Apart from that, the alerting system 10' further includes a distance detector 19 configured to continuously measure the distance between the vehicle 300 and an adjacent vehicle 350 before it. Assuming the vehicle 300 stops because of a red light, the system 10' will alert the driver 200 only when: i) the traffic light 400 turns green, ii) the driver's gaze direction V is not toward the traffic light 400, and iii) the distance between the vehicles 300 and 350 exceeds a default distance. Precisely, if all the above criteria are met, the control unit 16 issues a trigger signal to enable the alarming device 18 and therefore to alert the driver 200. On the other hand, if, for instance, it is determined that the distance between the two vehicles 300 and 350 is less than the default distance, the alert will not be given until the distance becomes greater than the default distance. The reason is, even if the first two criteria are met, the driver 200 may not be able to move the vehicle 300 if there is no sufficient space to move forward. Thus, to ease any unnecessary anxiety, the alarming device 18 will not be enabled under such circumstance. Further, as mentioned previously, the distance detector 19 is capable of constantly measuring the distance between the two vehicles 300 and 350, so the alerting system 10' can immediately alert the driver 200 once the vehicle 350 is moving away (e.g. either moving forward or making a turn).

In another scenario, assuming the vehicle 300 is moving toward a cross section and the traffic light 400 ahead is about to change to red. The alerting system 10' of the present invention may alert the driver 200 when the following conditions are satisfied: i) the traffic light 400 changes to red, ii) driver 200 is not looking at the traffic light 400, and iii) the distance between the two vehicles 300 and 350 is less than a default distance. The third criterion indicates that the front vehicle 350 has been slowing down because of the red light, so the driver 200 needs to slow down to prevent collision. In other words, even if the first two criteria are met, the system 10 will not alert the driver so long as the vehicle 350 is distant. As mentioned, the distance detector 19 of the present invention can constantly measure the distance between the vehicles 300 and the vehicle before it (in the present case, vehicle 350), the alerting system 10' is able to alert the driver 200 immediately once the vehicle 300 is getting close to the vehicle 350 (i.e. when their distance is less than the default distance). It should be noted, however, that the third criterion only kicks in when there is a vehicle in front of the vehicle 300; if, on the other hand, the vehicle 300 is the first vehicle about to cross the section in its line, the alerting system 10' of the present invention will give alerts even only the first two criteria are met to avoid the vehicle 300 from running the red light. By alerting the driver 200 in such circumstance, the chance of collision can be greatly eliminated.

In some embodiment, the alarming device 18 may be embedded in the vehicle 300. Alternatively, it can be any device capable of achieving the same purpose as described above. For instance, the alarming device 18 may be a handheld device (e.g. a mobile phone or a tablet) electronically and/or wirelessly connected to the control unit 16. Thus, if the driver 200 is looking at the handheld device while waiting at the red light, once the traffic light 400 turns green, any sort of alarming, e.g. sounds, lights, vibrations, etc. can be issued via the handheld device to notify the driver 200.

Figure 5:
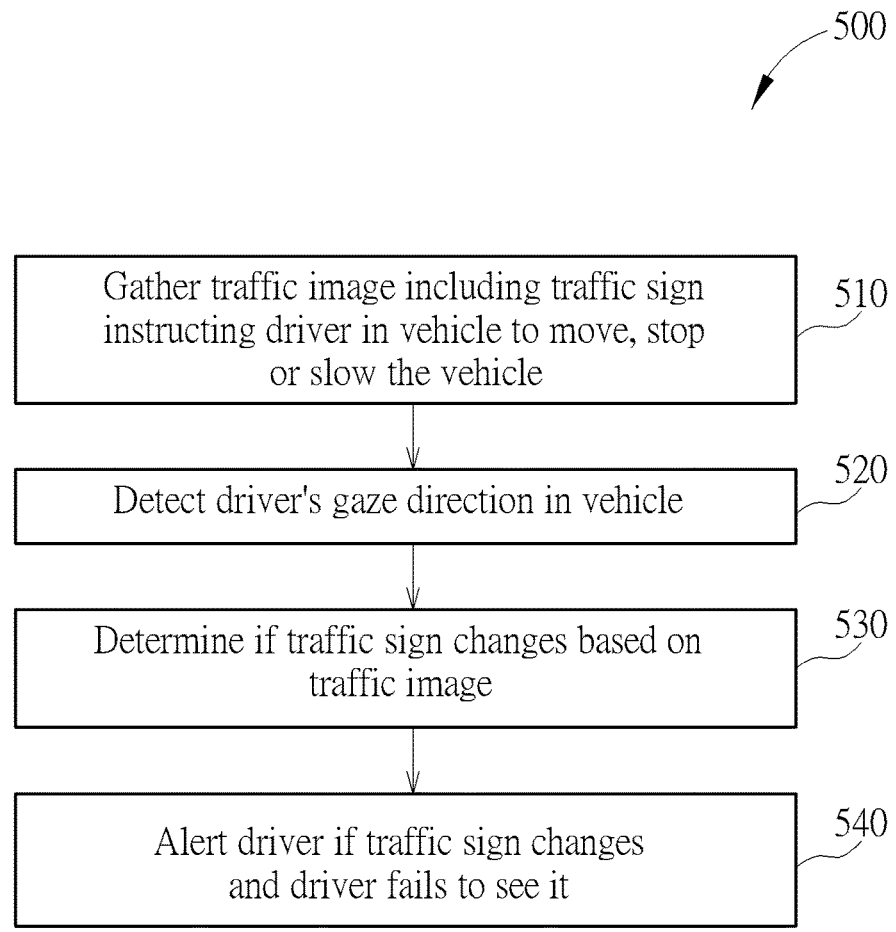
FIG. 5 is a flowchart showing a method of alerting a driver in a vehicle according to the present invention.

FIG. 5 is a flowchart 500 of an alerting method in accordance with the present invention. The method may include the following steps:

Step 510: gathering traffic images including a traffic sign instructing a driver in a vehicle to move, stop or slow the vehicle;

Step 520: detecting the driver's gaze direction in the vehicle;

Step 530: determining if the traffic sign changes based on the traffic images; and Step 540: alerting the driver if the traffic sign changes and the driver fails to see it.

Aside from the steps, the method may further include measuring the distance between the vehicle and the vehicle before it. In one scenario where the vehicle 300 is waiting at the red light and there is at least one another vehicle ahead of it, the alert will be given if the distance is greater than a default distance; while in another scenario where the vehicle 300 is moving forward and there is also another vehicle ahead of it, then the alert will be issued if the distance is less than another default distance.

Moreover, as discussed, the determination as to whether the driver is paying attention to the traffic sign is made based on the driver's gaze direction. If it is detected that the driver's gaze is not toward the direction of the traffic sign, the present invention presumes that the driver is not looking at the traffic sign, and consequently, the driver would not be aware of any change of the traffic sign.

In light of foregoing, the alerting system of the present invention alerts the driver of a vehicle when he/she fails to notice the change of the critical traffic sign. According to the disclosure, any sort of alarming, such as sounds, lights, images, vibrations, and/or any combination of the above may be adopted to alert the driver. Moreover, as discussed, the alerting system in the present invention may take a further step and only alert the driver if some additional criteria are also met. For instance, the invention may take the distance between with the front vehicle into account. Based on the design, the driver can not only be promptly but properly notified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An alerting system disposed in a vehicle, comprising:
   an image capturing module configured to capture traffic images surrounding the vehicle and containing at least one traffic sign therein;
   a gaze detector configured to detect a gaze direction of a driver in the vehicle;
   a distance detector configured to measure a distance between the vehicle and another vehicle in front of it;
   a control unit connected to the image capturing module and the gaze detector; the control unit is configured to analyze the traffic images and generate a trigger signal when it determines that the traffic sign changes, the driver fails to notice the change and the distance is less than a default distance while the vehicle is moving forward; and
   an alarming device configured to alert the driver upon the receipt of the trigger signal.

2. The alerting system of claim 1, wherein the control unit determines the driver does not notice the traffic sign change based on the driver's gaze direction.

3. The alerting system of claim 1, wherein while the vehicle stops because of a red light, the alarming device alerts the driver when the traffic sign turns to a green light and the driver's gaze direction is not toward the direction of the traffic sign.

4. The alerting system of claim 1, wherein while the vehicle is moving forward because of a green light, the alarming device alerts the driver when the traffic sign turns to a red light and the driver's gaze direction is not toward the direction of the traffic sign.

5. The alerting system of claim 1, wherein while the vehicle stops because of a red light, the alarming device alerts the driver if the distance exceeds a default distance.

6. The alerting system of claim 1, the alarming device alerts the driver via sounds, lights, images, and/or vibrations.

7. The alerting system of claim 1, wherein the alarming device may be a handheld device.

8. The alerting system of claim 1, wherein the alarming device stops alerting the driver if the driver's gaze is toward the direction of the traffic sign.

9. A method of alerting a driver in a vehicle, comprising:
   gathering a plurality of traffic images that contain at least one traffic sign;
   detecting the driver's gaze direction;
   detecting a distance between the vehicle and another vehicle in front of it;
   determining if the traffic sign changes based on the traffic images and the distance is less than a default distance while the vehicle is moving forward because of a green light;
   alerting the driver if the traffic sign changes, the driver fails to notice the change and the distance is less than the default distance.

10. The method of claim 9, further comprising determining the driver does not notice the change of the traffic sign if the driver's gaze direction is not toward the traffic sign.

11. The method of claim 9, wherein while the vehicle stops because of a red light, the method further comprises alerting the driver if the traffic sign turns green and the driver's gaze direction is not toward the traffic sign.

12. The method of claim 9, wherein while the vehicle is moving forward because of a green light, the method further comprises alerting the driver if the traffic sign turns red and the driver's gaze direction is not toward the traffic sign.

13. The method of claim 9, wherein while the vehicle stops because of a red light, the method further comprises alerting the driver if the distance exceeds a default distance.

14. The method of claim 9, further comprising alerting the driver via sounds, lights, images, and/or vibrations.

15. The method of claim 9, further comprising alerting the driver via a handheld device.

16. The method of claim 9, further comprising stop alerting the driver if the driver's gaze is toward the direction of the traffic sign.

* * * * *